United States Patent
Husted et al.

(10) Patent No.: US 8,279,974 B1
(45) Date of Patent: Oct. 2, 2012

(54) DYNAMIC POWER REDUCTION IN A WIRELESS RECEIVER

(75) Inventors: Paul J. Husted, San Jose, CA (US); Soner Ozgur, Santa Clara, CA (US)

(73) Assignee: QUALCOMM Atheros, Inc., San Jose, CA (US)

( * ) Notice: Subject to any disclaimer, the term of this patent is extended or adjusted under 35 U.S.C. 154(b) by 708 days.

(21) Appl. No.: 12/264,842

(22) Filed: Nov. 4, 2008

(51) Int. Cl.
*H03K 9/00* (2006.01)

(52) U.S. Cl. ........ 375/316; 375/341; 375/262; 375/340; 375/260; 375/219; 455/219; 455/232.1

(58) Field of Classification Search ................ 375/316, 375/341, 262, 340, 260, 219; 455/219, 232.1
See application file for complete search history.

(56) References Cited

U.S. PATENT DOCUMENTS

| | | | | |
|---|---|---|---|---|
| 5,644,597 A | * | 7/1997 | Ueda | 375/232 |
| 6,134,430 A | * | 10/2000 | Younis et al. | 455/340 |
| 6,639,939 B1 | * | 10/2003 | Naden et al. | 375/140 |
| 6,859,656 B2 | | 2/2005 | Choi et al. | |
| 7,082,107 B1 | | 7/2006 | Arvelo | |
| 7,212,423 B2 | * | 5/2007 | Vogt | 365/52 |
| 7,304,969 B2 | * | 12/2007 | Ryan et al. | 370/332 |
| 7,386,063 B1 | * | 6/2008 | Husted | 375/316 |
| 2002/0176482 A1 | * | 11/2002 | Chien | 375/132 |
| 2005/0053039 A1 | | 3/2005 | Dewan et al. | |
| 2005/0101340 A1 | * | 5/2005 | Archiable | 455/522 |
| 2007/0184811 A1 | * | 8/2007 | Ballantyne | 455/343.2 |
| 2008/0008117 A1 | * | 1/2008 | Alizadeh-Shabdiz | 370/328 |
| 2008/0076364 A1 | | 3/2008 | Hall | |
| 2008/0219323 A1 | * | 9/2008 | Desai et al. | 375/132 |
| 2009/0042527 A1 | * | 2/2009 | Niknejad | 455/234.2 |
| 2009/0219863 A1 | * | 9/2009 | Sen et al. | 370/329 |

* cited by examiner

*Primary Examiner* — Kenneth Lam
(74) *Attorney, Agent, or Firm* — Bay Area Technology Law Group PC (57) ABSTRACT

Various techniques for dynamically reducing power usage in a wireless receiver are disclosed. A receiver unit receives a wireless signal over a channel and processes the wireless signal, including dynamically changing one or more of the settings of the receiver unit to control its power usage. These setting are changed in response to one or more power setting values that are generated based on a first set of information that includes state information for the channel. The receiver unit may dynamically change a first setting that causes the bias current applied to an analog-to-digital converter to be changed. The channel state information may include information indicative of a received signal strength indication (RSSI), information indicative of a packet error rate (PER) for packets encoded on the wireless signal, and header error check (HEC) and/or cyclical redundancy check (CRC) errors for data packets encoded on the wireless signal.

16 Claims, 9 Drawing Sheets

DYNAMIC POWER REDUCTION IN A WIRELESS RECEIVER

BACKGROUND OF THE INVENTION

1. Technical Field

This disclosure relates generally to wireless communications, and more specifically, to dynamically reducing power consumption in wireless receivers.

2. Description of the Related Art

Wireless communication involves a transmitting device that modulates a carrier wave to transmit information on the modulated signal over a wireless network. On the receiving end, a receiving device demodulates the carrier wave to decode the transmitted information. Various modulation schemes and transmission protocols are possible.

The Bluetooth standard established by the Bluetooth Special Interest Group is one example of a protocol designed for use in short-range wireless communications over a personal area network (PAN) or piconet. The Bluetooth protocol provides a low-power communication standard that operates in the 2.4 GHz band on devices with an effective communication range of up to 100 meters. The Bluetooth 2.0 and 2.1 standards support a variety of modulations schemes at multiple transmission speeds. The Bluetooth specification also establishes several requirements for transmitting and receiving devices.

SUMMARY

Various techniques for dynamically reducing power usage in a wireless receiver are disclosed.

In one embodiment, a method for controlling power usage of a wireless receiver includes a receiver unit receiving a wireless signal over a channel and processing the wireless signal, where the processing includes the receiver unit dynamically changing one or more of its settings to control its power usage. These setting are changed in response to one or more power setting values that are generated based on a first set of information that includes state information for the channel. In certain embodiments, the receiver unit performs analog-to-digital conversion of the wireless signal using a sigma-delta analog-to-digital converter (ADC), and dynamically changes a first setting of the receiver unit that causes the bias current applied to the ADC to be changed. In some embodiments, the receiver unit detects symbols from a digitized version of the wireless signal using a currently selected one of a plurality of symbol detectors, and dynamically changes a setting that causes the currently active symbol detector to change. In other embodiments, the received wireless signal includes I and Q quadrature components, and the receiver unit dynamically changes a setting that causes the receiver unit to discard one of the quadrature components. In various embodiments, the state information for the channel on which the power setting values are generated may include information indicative of a received signal strength indication (RSSI), information indicative of a packet error rate (PER) for packets encoded on the wireless signal, and information indicative of header error check (HEC) and/or cyclical redundancy check (CRC) errors for data packets encoded on the wireless signal.

In another embodiment, an apparatus including a receiver unit is disclosed. The receiver unit may be a Bluetooth receiver in one embodiment. In one embodiment, the receiver unit may include a power control unit that is configured to generate the one or more power setting values. In certain embodiments, the power control unit includes a processor and memory, and generates the power setting values by the processor executing program instructions stored in the memory. The processor and the receiver unit may be located on a common die. In various embodiments, the receiver unit may include an amplifier unit, a sigma-delta analog-to-digital converter, a signal processing unit, and a plurality of symbol detectors.

In another embodiment, a method is disclosed in which, during a communication session over a wireless channel that includes reception of a wireless signal by a receiver unit, one or more power settings values are dynamically generated responsive to a first set of information that provides partial state information for the wireless channel. The one or more power setting values are conveyed to the receiver unit, where the one or more power setting values cause the receiver unit to change one or more settings that control its analog or digital power usage.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner in one or more embodiments.

Figure 1A:
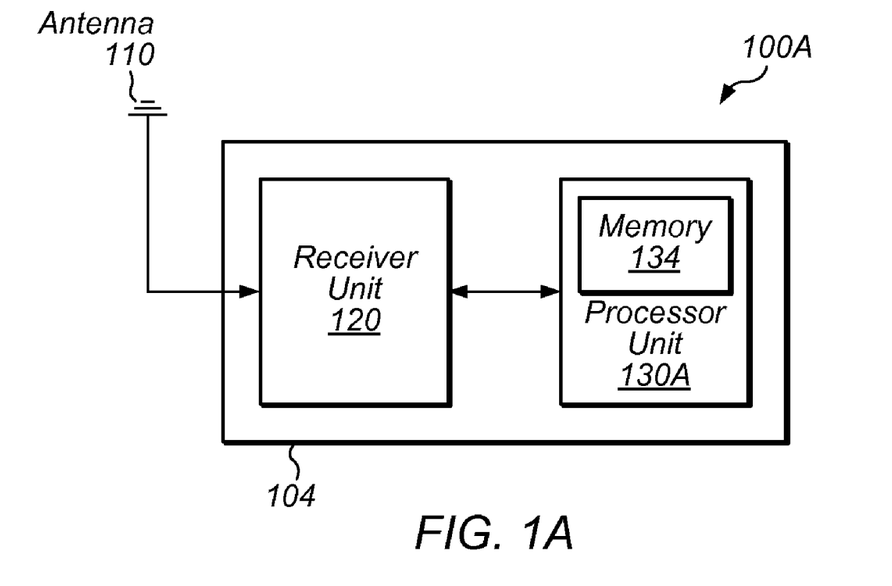
FIGS. 1A and B are block diagrams illustrating two embodiments of communication devices.
Figure 1B:
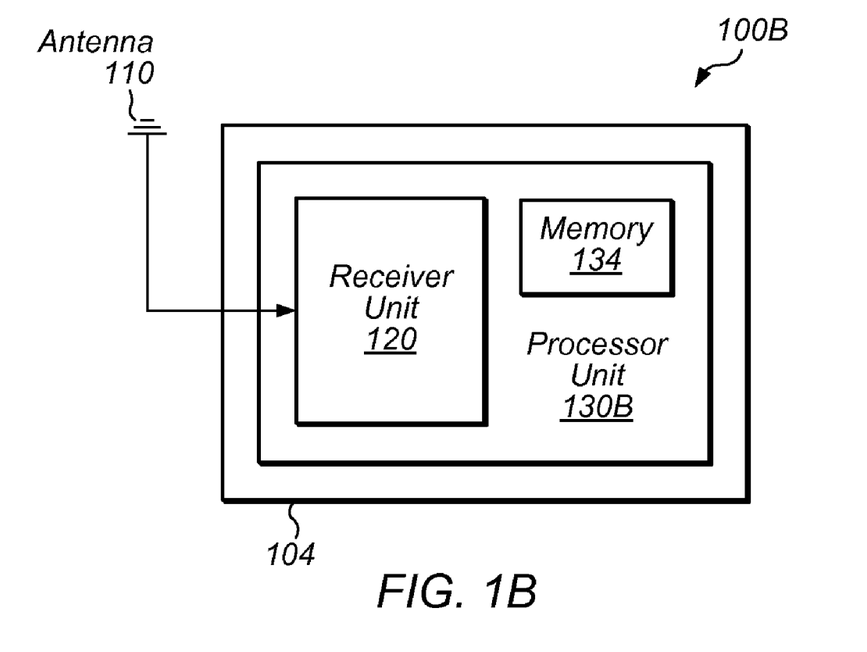

The power reduction techniques described below may be performed on any suitable type of wireless communication device. FIGS. 1A and 1B are block diagrams illustrating two embodiments of communication devices that may be used to implement the techniques described below. In FIG. 1A, a communication device 100A includes a housing 104 that contains a receiver unit 120 coupled to a processor unit 130A and to an antenna 110. Antenna 110 may be external (as depicted) or internal to housing 104. In other embodiments, receiver unit 120 may include antenna 110. In one embodiment, receiver unit 120 and processor unit 130A may be separate components (e.g., chips), while in another embodiment, receiver unit 120 and processor unit 130A may be located on the same die. For example, FIG. 1B illustrates an embodiment in which a communication device 100B contains a processor unit 130B including receiver unit 120.

Communication devices 100A and 100B (collectively referred to as communication device 100) may be or be included in any of various types of devices, including but not limited to: a mobile phone, wireless headset, pager, global positioning system (GPS) unit, video game console, digital camera, printer, desktop computer, laptop, or personal digital assistant (PDA). Communication device 100 may be any type of networked peripheral device such as storage devices, switches, modems, routers, etc. In various embodiments, commutation device 100 may implement any of a variety of communication protocols, including but not limited to: Bluetooth, WiFi, or WiMax.

Processor units 130A and 130B (collectively referred to as processor unit 130) may each contain one or more processors. In various embodiments, processor unit 130 may include general-purpose processors used to perform multiple various functions, or may include processors designed to perform specialized operations. In various embodiments, processor unit 130 may include a memory 134 (as in FIGS. 1A and 1B) or may be externally coupled to a memory 134 that is external to processor unit 130. In various embodiments, memory 134 may include magnetic storage media or volatile and/or non-volatile semiconductor memory such as flash memory, random access memory (RAM-SRAM, EDO RAM, SDRAM, DDR SDRAM, Rambus® RAM, etc.), and/or read only memory (PROM, EEPROM, etc.). Processor unit 130 may include various other components (not illustrated) such as a cache, superscalar pipeline, I/O interface, etc. Examples of I/O devices that may be coupled to the I/O interface include storage devices (hard drive, optical drive, removable flash drive, storage array, SAN, or their associated controller), network interface devices (e.g., to a local or wide-area network), or other devices (e.g., graphics, user interface devices, etc.).

Receiver unit 120 is configured to receive a wireless signal (e.g., from antenna 110 or circuitry coupled thereto) and process it. Although the term "wireless signal" is used herein for convenience, it is noted that a wireless signal may be regarded as a composite of multiple component signals. The received wireless signal may include digital information signals that have been modulated with a carrier signal and transmitted over a wireless communication channel. Once a transmitted wireless signal is received, the original information signals may be obtained by demodulating the wireless signal. In one embodiment, a wireless signal may be modulated using quadrature modulation where the I and Q quadrature components correspond to respective digital information signals. For example, the quadrature components may be modulated using carrier signals that are 90 degree out-of-phase (e.g., the I quadrature component is modulated using a sine wave while the Q quadrature component is modulated using a cosine wave). In an alternative embodiment, a wireless signal may be modulated using polar modulation where r (amplitude) and Θ (phase) components correspond to respective digital information signals.

In various embodiments, receiver unit 120 may be configured to implement a Bluetooth protocol, e.g., where receiver unit 120 receives a 2.4 GHz wireless signal with a signal strength of −90 dBm to 0 dBm. Certain Bluetooth protocols allow a receiver to communicate using a variety of options. Accordingly, receiver unit 120 may, in one embodiment, be configured to negotiate various appropriate transmission parameters (e.g., modulation schemes, transmission speeds, use of encryption, etc.). In such an embodiment, receiver unit 120 may perform different operations depending on the negotiated parameters. For example, in various embodiments, receiver unit 120 may receive wireless signals that are transmitted at 1 Mbps (e.g., using GFSK modulation), 2 Mbps, and 3 Mbps (e.g., using pi/4-DQPSK and 8-DPSK modulation). Thus, for example, when receiver unit 120 uses a GFSK modulation scheme or a 1 Mbps transmission rate, it may use different methods and/or components than when using, e.g., a pi/4-DQPSK modulation scheme and a 2 Mbps transmission rate.

As will be described in greater detail below, receiver unit 120 may process a wireless signal using a variety of techniques of varying complexity. Each of these techniques may consume different amounts of power while providing different levels of performance. The power usage of various techniques is often affected by the complexity of circuitry or software that implements the technique. For example, a complex filtering technique, implemented using analog circuitry, may have a higher analog power usage than a less complex filtering technique because the complex filter may consume greater amounts (e.g., watts) of power. In general, when receiver unit 120 requires better dynamic range, better-performing processing techniques are selected, which typically consume more power. Depending on the selection, the power usage of receiver unit 120 may be dynamically or automatically controlled or regulated. As used herein, the terms "dynamically" and "automatically" in the context of power usage, refer to controlling or regulating characteristics of a device without explicit operator intervention at that time (e.g., an explicit user command to change a power characteristic). In various embodiments, receiver unit 120 may be designed to use the most efficient processing techniques to provide sufficient accuracy for the particular wireless communication session. This goal may be achieved, for example, by monitoring channel state information. Such an architecture may permit a communication device 100 to perform differently under different channel conditions and different interference conditions.

As illustrated in FIGS. 1A and 1B, receiver unit 120 may be internal or external to processor unit 130. As such, various processing components of receiver unit 120 (described in greater detail below) may be implemented within receiver unit 120 or processing unit 130. In various embodiments, these components may be implemented as hardware or software. For example, if processor unit 130 contains receiver unit 120, processor unit 130 may implement certain receiver components using analog and digital circuitry, or in software (e.g., program instructions stored in memory 134 that are executed by one or more processors within processor unit 130).

Various embodiments of receiver unit 120 are described further in U.S. patent application Ser. No. 12/016,955, entitled "Hybrid Zero-IF Receiver" and filed on Jan. 18, 2008, and U.S. application Ser. No. 12/122,013, entitled "Timing Tracker for DPSK Receiver" and filed on May 16, 2008. Both of these applications are incorporated by reference herein in their entireties.

Figure 2A:
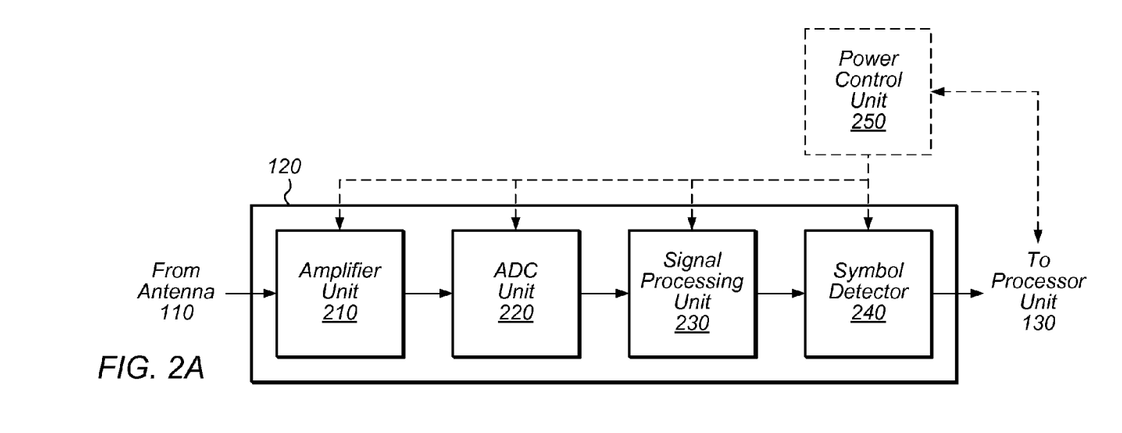
FIGS. 2A-D are block diagrams illustrating various embodiments of receiver units.

FIGS. 2A-D are block diagrams illustrating various embodiments of receiver unit 120. In FIG. 2A, receiver unit 120 includes an amplifier unit 210, an analog-to-digital converter (ADC) unit 220, a signal processing unit 230, and a symbol detector 240 that are coupled together. As shown, a power control unit 250 may be coupled to amplifier unit 210, ADC unit 220, signal processing unit 230, symbol detector unit 240, and processor unit 130. In this embodiment, receiver unit 120 receives wireless signals from antenna 110 and supplies detected symbols to processor unit 130. It is noted that while blocks are depicted in a particular ordering, in other embodiments additional blocks may be added or the ordering may be changed (e.g., ADC unit 220 and signal processing unit 230 may appear in a different ordering), and there may be other connections between the various units than those shown. Numerous other configurations of receiver unit 120 are possible.

In the embodiments shown in FIGS. 2A-D, amplifier unit 210 receives a wireless signal from antenna 110 and amplifies it for processing by receiver unit 120. In one embodiment, amplifier unit 210 may contain an automatic gain control (AGC) block that adjusts the amount of amplification based on the changing conditions of the wireless channel. For example, the AGC block (not shown) may automatically increase amplification if the strength of a detected signal weakens, or it may decrease amplification if the signal strengthens. In one such embodiment, the AGC block may include a feedback control loop including a mixer and one or more filters.

In the embodiments shown in FIGS. 2A-D, ADC unit 220 converts an amplified, analog signal received from amplifier unit 210 to a digital signal for further processing by receiver unit 120. To accomplish this, ADC unit 220 may sample an incoming signal at variety of sampling rates using different techniques, as desired. ADC unit 220 is described in greater detail below in conjunction with FIG. 3.

In the embodiments shown in FIGS. 2A, C, and D, signal processing unit 230 demodulates a digital signal and processes the digital signal (e.g., to remove noise). In general, when a wireless signal is transmitted, it may be affected by interference present in the channel (e.g., from the receiving circuit itself, an interfering signal (referred to as a "blocker"), etc.). Sometimes this interference may occur as the result of another transmission such as one that occurs at only a given frequency range (i.e., a stationary blocker), or one that continually hops between a set frequencies (i.e., a non-stationary blocker). The ratio of the received signal strength to the amount of interference is often referred to as a signal to noise ratio (SNR). The SNR of the received signal may be low if the signal is weak compared to the noise; conversely, the SNR may be high if the signal is strong compared to the noise. Signal processing unit 230 may process a signal in various embodiments to increase the signal strength or remove undesirable interference using various filters and mixers. For example, in some embodiments, operations of signal processing unit 230 may include filtering the received signal (e.g., using one or more low pass filters), lowering the sampling rate of the received signal, removing any DC offset, adjusting the phase of the signal, and/or demodulating the received signal. In one embodiment, receiver unit 120 may also implement an adaptive frequency-hopping (AFH) algorithm in which a wireless signal pseudo-randomly changes carrier frequencies at regular time intervals to avoid interference from a stationary blocker (e.g., a WLAN). In various embodiments, signal processing functionality may be performed by a processor within communication device such as processor unit 130.

Symbol detector unit 240 shown in FIGS. 2A, C, and D may analyze the version of the wireless signal it receives to determine a set of corresponding symbols. In general, the term "symbol" describes the state of the wireless signal during some period of time. Symbols may encode individual bits or a plurality of bits in a set of data. To detect a symbol from the wireless signal, a symbol detector may analyze the (digital or analog) received signal during a symbol interval using one or more samples to determine the amplitude and/or any phase change. In various embodiments, symbol detector unit 240 may contain a plurality of symbol detectors that implement different detection techniques. Each of these techniques may offer different levels of performance using different amounts of power. In some embodiments, the symbol detector(s) that are used (active) may be unique to certain modulation schemes or a given transmission rate. Symbol detector unit 240 is described in greater detail below in conjunction with FIGS. 4A and 4B.

Figure 2B:
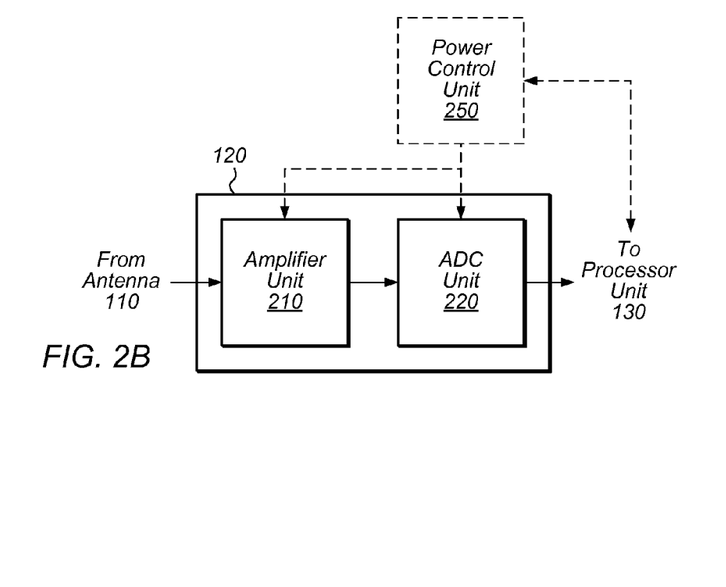
Figure 2C:
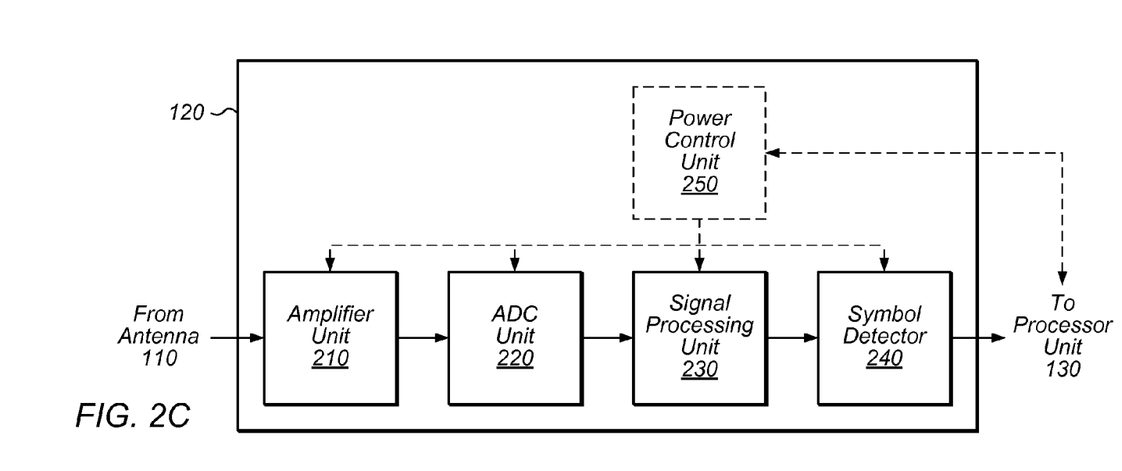
Figure 2D:
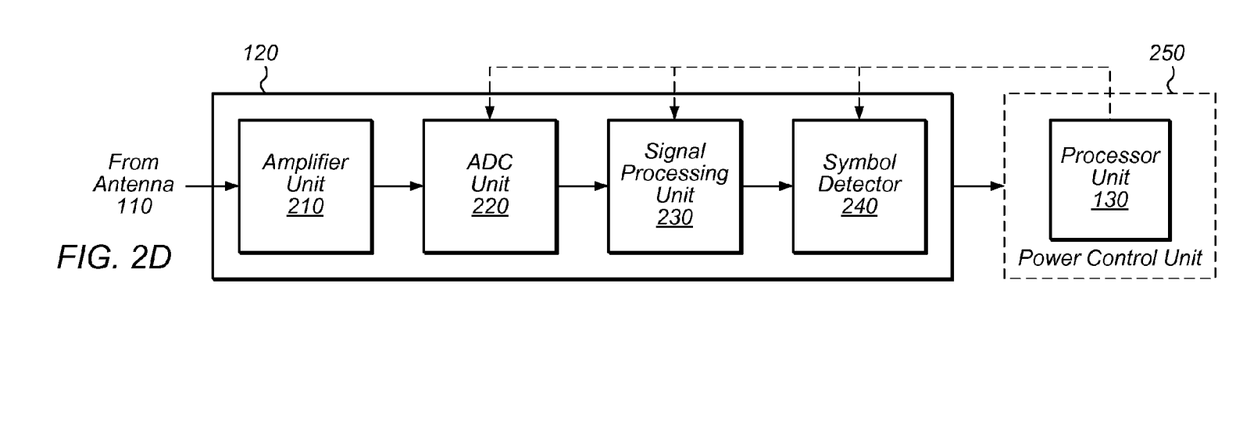

FIGS. 2A-2D each illustrate a power control unit 250. Power control unit 250 is illustrated in FIGS. 2A, 2B, and 2D with a dotted line to indicate that it may be physically implemented in a variety of different manners. These embodiments thus depict a logical view of power control unit 250. In FIGS. 2A-2D, power control unit 250 may change settings of various blocks in receiver unit 120 to regulate the performance and power usage of receiver unit 120 depending on state information of the wireless channel. As shown in FIG. 2A, power control unit 250 may change settings of any of amplifier unit 210, ADC unit 220, signal processing unit 230, signal detector unit 240, and processor unit 130. Additionally, power control unit 250 may receive information from processor unit 130. In other embodiments, power control unit 250 may be coupled with other combinations of blocks. In one embodiment, power control unit 250 may, during operation, change settings dynamically. In some embodiments, power control unit 250 may be implemented as combinatorial logic (e.g., configured to implement a state machine). Such logic may be internal or external to receiver unit 120. In another embodiment, power control unit 250 may be a separate processor that is coupled to a memory that stores program instructions executable by the processor. Various inputs and outputs to power control unit 250 are described further with reference to FIGS. 5A-B.

As noted earlier, amplifier unit 210, ADC unit 220, signal processing unit 230, symbol detector unit 240, and power control unit 250 may be arranged in a variety of ways.

FIG. 2B illustrates another embodiment of receiver unit 120 that includes only amplifier unit 210 and ADC unit 220. In such an embodiment, receiver unit 210 receives a wireless signal from antenna 110 and outputs an amplified, digitized version of the wireless signal to processor unit 130. In the embodiment of FIG. 2B, the remaining functionality is implemented in software (e.g., by a processor such as processor unit 130 executing program instructions stored in a memory such as memory 134).

FIG. 2C illustrates another embodiment of receiver unit 120 that includes power control unit 250. In such an embodiment, receiver unit 120 may implement power control unit 250 in hardware or in software.

FIG. 2D illustrates yet another embodiment of receiver unit 120 in which power control unit 250 is implemented externally to receiver unit 120. In the illustrated embodiment, power control unit 250 is implemented by processor unit 130 (e.g., executing program instructions stored in memory 134). Processor unit 130 may, in various embodiments, include dedicated functional units that are particularly suited for various signal processing techniques. In yet another embodiment, power control unit 250 may be implemented in hardware that is external to receiver unit 120.

As noted above, receiver unit 120 may be configured to implement various Bluetooth standards. In the illustrated embodiments of FIGS. 2A-2D, amplifier unit 210, ADC unit 220, signal processing unit 230, and symbol detector unit 240 may be configured accordingly. In one embodiment, for example, signal processing unit 230 may use separate sets of mixers, filters, etc. depending upon whether the received Bluetooth signal is 1, 2, or 3 Mbps. In another embodiment, symbol detector unit 240 may select different symbol detectors based on modulation scheme and/or transmission rate of the received Bluetooth signal.

Figure 3:
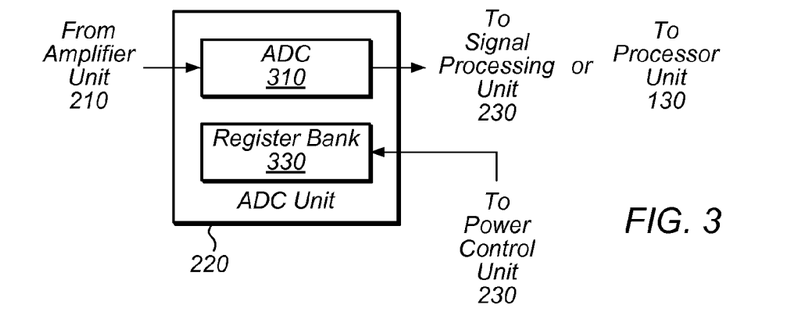
FIG. 3 is a block diagram illustrating one embodiment of an ADC unit.

FIG. 3 is a block diagram illustrating one embodiment of an ADC unit 220. As shown, ADC unit 220 may include an ADC 310 that receives an amplified analog signal from amplifier unit 210, performs analog-to-digital conversion, and provides a digital signal to signal processing unit 230. In one embodiment, ADC 310 may be a sigma-delta analog-to-digital converter. In various embodiments, ADC unit 220 may include multiple ADC 310s for digitizing one or more received signals. In some embodiments, power control unit 250 may be able to change the operation of ADC unit 220 by writing to one or more predetermined locations in register bank 310.

In one embodiment, ADC unit 220 may receive either a full-bias current or a reduced-bias current, depending the strength of the wireless signal and the state of the channel. In a full-bias current mode, ADC unit 220 may consume more power while enabling receiver unit 120 to intercept a greater dynamic range of wireless signals relative to a reduced-bias current mode. Conversely, during a reduced-bias current mode, ADC unit 220 may consume less power while providing a lesser dynamic range relative to full-bias current mode. For example, in one embodiment, ADC unit 220 consumes up to 2 mA less by applying reduced-bias current instead of a full-bias current, where receiver unit 120 maintains a 40 dB blocker margin (i.e., separation between a received signal and any interfering signal) for received signals of up to −65 dBm when operating in full-bias current mode, and a 35 dB blocker margin when operating in reduced-bias current mode.

In various embodiments, the quantization step size of ADC unit 220 (e.g., the number of bits used to quantize the analog input signal to unit 220) may be adjustable. In one embodiment, the quantization step size of ADC unit 220 may either be 2 bits or 1 bit. The quantization step size of unit 220 may be set orthogonally relative to the bias current setting, meaning that unit 220's quantization step size is adjustable independent of the bias current setting. Accordingly, the bias current of ADC unit 220 may be reduced while leaving the quantization step size constant (e.g., at 2 bits). These settings may be employed, for example, when a wireless signal is experiencing a large amount of interference or is small in amplitude. Also, the bias current of ADC unit 220 may be reduced while also reducing quantization step size (e.g., from 2 bits to 1 bit) by turning off the last stage of unit 220. These settings may be employed, for example, when the wireless signal is not experiencing a large amount of interference and the signal is large in amplitude.

In various embodiments, the automatic gain control (AGC) of amplifier unit 210 may be adjusted depending on the whether ADC unit 220 is receiving a full-bias current or a reduced-bias current. For example, more gain may be applied when the ADC unit 220 is operating in a reduced-bias mode, and less gain may be applied when the ADC unit 220 is operating in a full-bias mode.

Figure 4A:
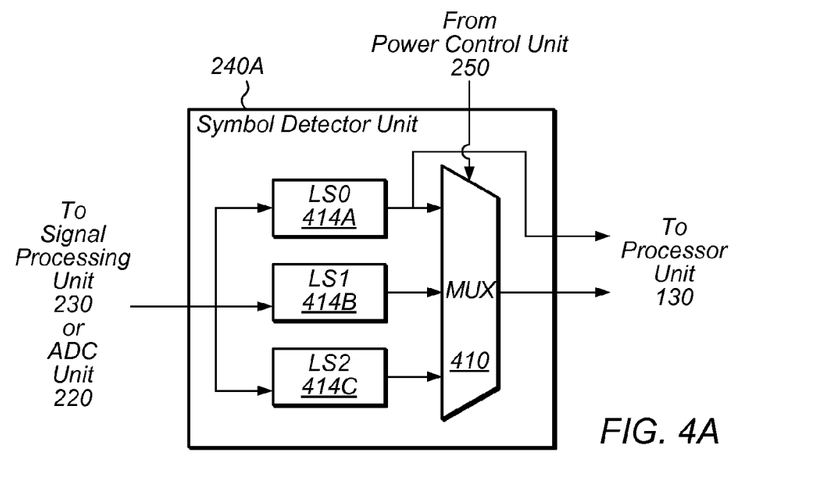
FIGS. 4A, B, and C are block diagrams illustrating embodiments of symbol detectors.

FIG. 4A is a block diagram of a symbol detector unit 240A, which is one embodiment of a symbol detector 240. In one embodiment, symbol detector unit 240A is used during 1 Mbps Bluetooth transmission, which may occur, in one embodiment, when the wireless signal is modulated using GFSK modulation. As shown, symbol detector unit 240A includes symbol detectors LS0, LS1, and LS2 (reference numerals 414A-C, respectively), which are coupled to a multiplexor (MUX) 410. In one embodiment, detectors LS1 and LS2 utilize some of the same hardware, with one of the detectors being selected for operation at a time (in some instances neither LS1 nor LS2 may be in use if LS0 is being used, allowing power to be saved by disabling LS1 and LS2).

In one embodiment, symbol detector unit 240 may receive a processed signal from signal processing unit 230 or ADC unit 220 and provide the received signal to any of the symbol detectors LS0, LS1, and LS2. The output symbols of symbol detectors 414 are selected by MUX 410 according to a value provided by, e.g., power control unit 250 and provided to processor unit 130. In one embodiment, more than one output may be provided to processor unit 130 for further processing (e.g., permitting the comparing of the output of LS0 and the output of LS2 as described below).

The symbol detectors LS0, LS1, and LS2 may employ different techniques of varying complexity for determining a symbol from an input signal (e.g., from unit 220 or unit 230). In one embodiment, LS0 may implement a detection technique that determines a symbol based solely on the phase of a single sample, while LS1 and LS2 may implement more complicated techniques that analyze multiple samples. LS1 and LS2 may compensate for inter-symbol interferences (ISI) using a Gaussian frequency-shaping filter. To implement such a filter, symbol detectors 414 may analyze a window that includes the current symbol and adjacent symbols. In one embodiment, LS1 may analyze a small window such as one created from the previous, current, and next symbols sampled at time intervals of −1, 0, 1 periods. LS2, in contrast, may analyze a larger window created from sampling the current symbol, adjacent symbols, and the midpoints between the adjacent and current symbols (e.g., sampling at time intervals of −1, −0.5, 0, 0.5, 1 periods). In one embodiment, LS2 may require a signal to be sampled at twice the signal rate as LS1.

In some embodiments, symbol detectors 414 that perform similar operations may share common circuitry or provide information to each other. In one embodiment, symbol detectors LS0, LS1, and LS2 each need to determine a phase of a signal, and thus share the same phase-determining block between them.

Because of their varying complexity, symbol detectors 414 (or 450 and 460 described below) may consume different amounts of power while providing different levels of performance. As a result, power control unit 250 may be used to help control the power usage of symbol detector unit 240—e.g., by selecting an appropriate symbol detector. For example, power control unit 250 may select a detector that consumes less power (e.g., LS0) in cases where better-performing symbol detectors (e.g., LS2) are unnecessary. (Note that in some embodiments when one symbol detector (e.g., LS1 or LS2) is currently active, the output of another symbol detector (e.g., LS0) may be used for comparative purposes to determine the accuracy of the current detector.) On the other hand, if conditions change and better performance is needed, power control unit may 250 may select a better-performing detector. In various embodiments, when power control unit 250 provides an input to MUX 410, symbol detector unit 240 may change the active symbol detector (i.e., the symbol detector that is currently being used to decode the information on the wireless signal). In one embodiment, changing the active symbol detector includes driving a clock signal for the selected symbol detector and disabling (or clock gating) the clock signal for the non-selected symbol detectors 414. In other embodiments, changing the active symbol detector involves selecting its output (e.g., via MUX 410). Such functionality may be accomplished in one embodiment by outputs of power control unit 250.

Figure 4B:
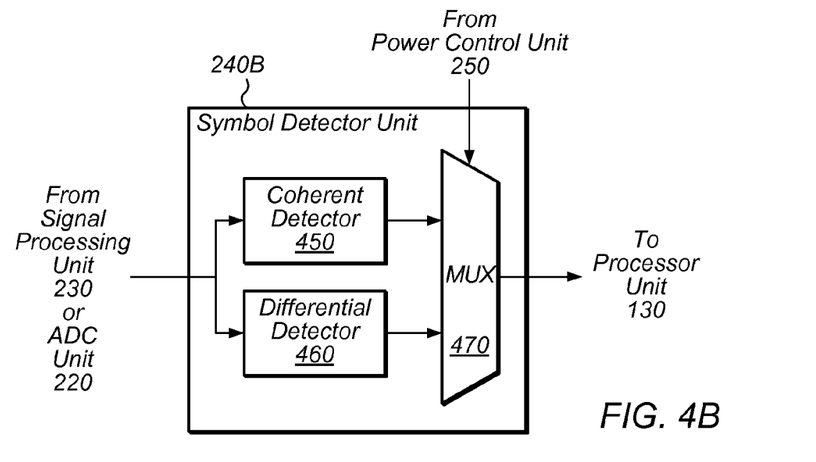

FIG. 4B is a block diagram of a symbol detector unit 240B, another embodiment of symbol detector 240. In one embodiment, symbol detector unit 240B is employed when the wireless signal is 2 or 3 Mbps Bluetooth signal, and/or when the wireless signal is modulated using a PSK modulation scheme. As shown, symbol detector unit 240B includes a differential symbol detector 450 and a coherent symbol detector 460, which are coupled to a multiplexer (MUX) 470. Symbol detector unit 240 may receive a processed signal from signal processing unit 230 or ADC unit 220 and provide the signal to each symbol detector. The output of the symbol detectors is selected by MUX 470 and provided to processor unit 130. The output of MUX 470 may be selected in response to an input from power control unit 250.

Differential symbol detector 450 and coherent symbol detector 460 employ different techniques for determining a symbol. In differential detection, a symbol is determined by measuring the phase change between received consecutive symbols. In coherent detection, a symbol is determined by tracking the signal phase and any frequency drifts. Coherent detection is a more complex operation that consumes more power than differential detection, but it is more resistant to noise and interference. As a result, coherent symbol detector 460 may be used when larger amounts of noise and interference are present. On the other hand, differential detection 450 may be used to conserve power in cases where coherent detection is unnecessary. In one embodiment, coherent detection may be used over differential detection when the detected or anticipated interference exceeds 30 dBc in order to provide a 2 dB improvement.

Figure 4C:
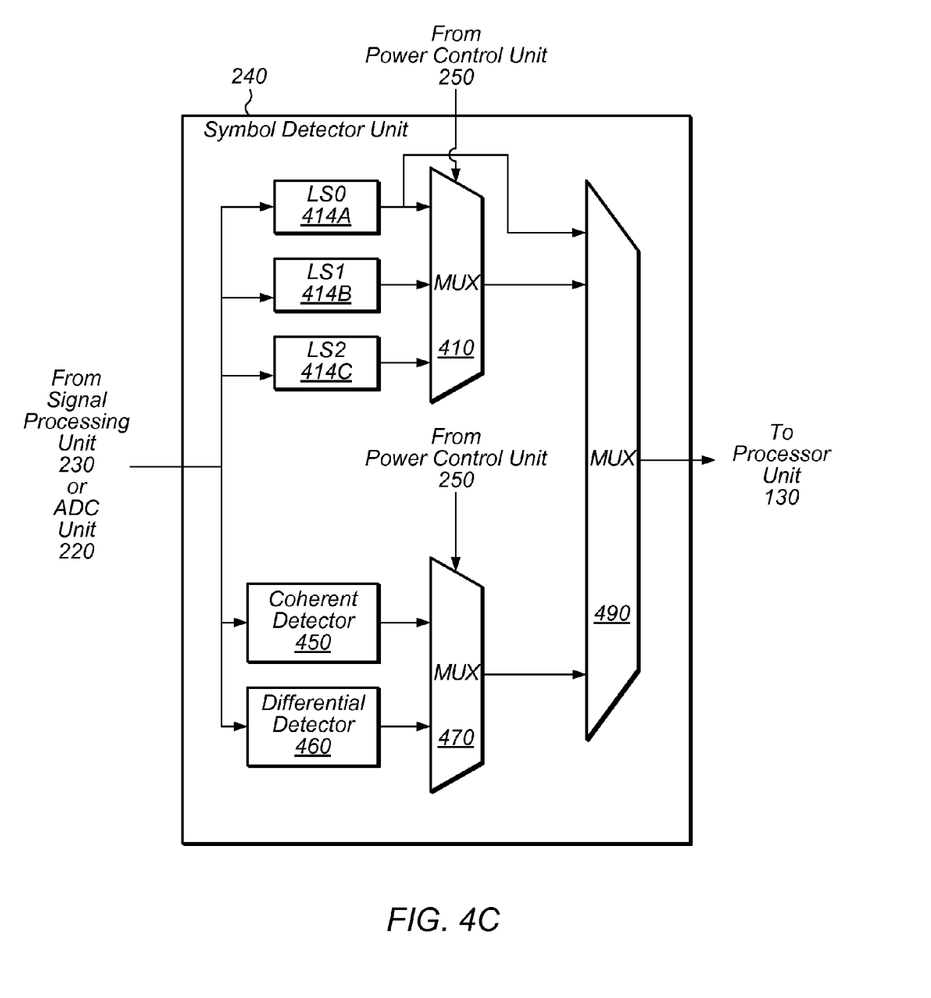

Note that while symbol detector units 240A and 240B are shown separately, symbol detector unit 240 may, in one embodiment (e.g., the embodiment shown in FIG. 4C), include all of the detectors shown in FIGS. 4A-B, and select among the various detectors using MUXs 410, 470, and 490 based not only on input from power control unit 250 but on information indicative of the current type of modulation for the wireless signal. (MUXs 410, 470 and 490 in FIG. 4C can of course be implemented as one MUX.) In various embodiments, the clock may be disabled (or clocked gated) for detectors that are not active.

Figure 5A:
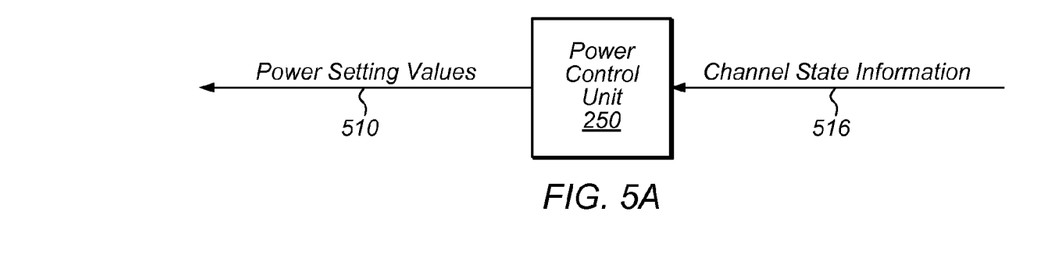
FIGS. 5A and B are block diagrams illustrating two embodiments of power control units.

FIG. 5A illustrates one embodiment of a power control unit 250. As shown, power control unit may receive channel state information 516 and generate power setting values 510 in response thereto. In this manner, power control unit 250 may dynamically change one or more power setting valves to control the operation of various blocks (e.g., blocks 210-240) in receiver unit 120.

Power settings values 510 are outputs of power control unit 250 that are used to control the operation of various blocks within receiver unit 120 (e.g., amplifier unit 210, ADC unit 220, signal processing unit 230, symbol detector unit 240, or any combination thereof) or processor unit 130. In one embodiment, power setting values 510 may be used to select an operating mode. For, example if the state of the wireless channel deteriorates, power control unit 250 may change the bias current in ADC unit 220 by outputting a particular setting value 510 (e.g., by writing to register bank 330). In another embodiment, power setting values 510 may be used to select and/or disable specified components with a block of receiver unit 120. For example, power control unit 250 may select or disable various components in signal processing unit 230, or select and disable certain symbol detectors in symbol detector unit 240. For example, power settings values 510 may be used to instruct receiver unit 120 to discard one quadrature component of a received wireless signal to reduce the SNR, which causes a chain of multiple receiver components to be disabled (e.g., one or more ADCs, quadrature filters, etc.).

As will be described in detail next, channel state information 516 can include a variety of information about the received wireless signal and the state of the channel. This information may include indications of signal strength, information indicative of interference conditions, indications of packet-level date errors, etc. These inputs may be provided from a variety of sources, including processor unit 130 and various blocks of receiver unit 120.

Figure 5B:
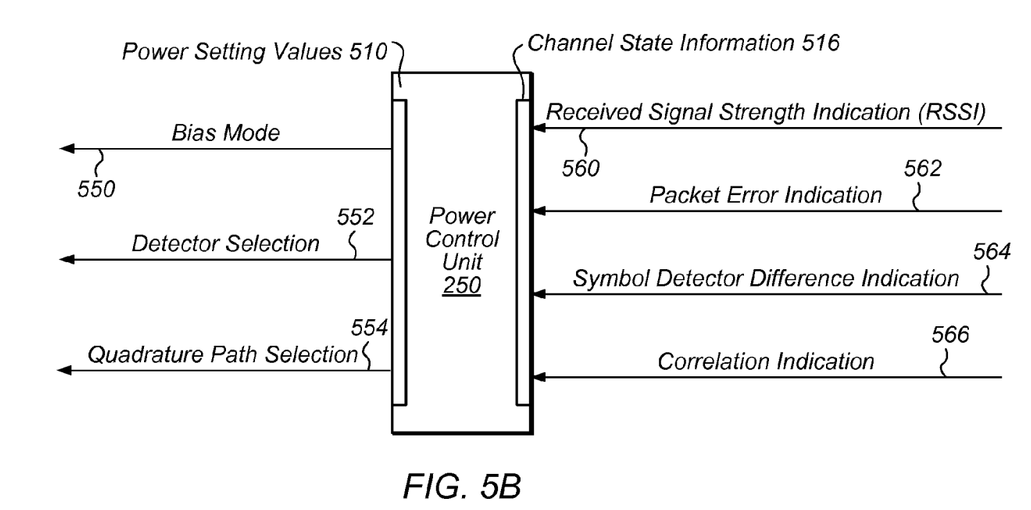

FIG. 5B illustrates one specific embodiment of a power control unit 250. As shown, power control unit 250 outputs power setting values 510 including bias mode 550, detector selection 552, and quadrature path selection 554 in response to receiving channel state information 516 including received signal strength indication (RSSI) 560, packet error indication 562, symbol detector difference indication 564, and correlation indication 566. Many different variations of these particular inputs and outputs are possible.

Received signal strength indication (RSSI) 560 indicates the strength of a signal as it is received, and is a good indication of channel conditions particularly at signal levels greater than −80 dBm. In various embodiments, RSSI 560 may be determined in hardware and/or software within receiver unit 120 and/or processor 130. In one embodiment, RSSI 560 may be determined after the received signal has been processed and prior to symbol detection (e.g., between signal processing unit 230 and symbol detector unit 240). In another embodiment, RSSI 560 may be determined prior to or during amplification in amplification unit 210. In some embodiments, RSSI 560 may be determined when the received signal is converted from an analog signal to a digital signal in ADC unit 220. In other embodiments, RSSI 560 may be determined from an intermediate frequency (IF) version of the wireless signal (e.g., in signal processing unit 230). Generally, RSSI is a metric that is frequently used when describing signal strength, and various methods for determining it are known in the art.

Packet error indication 562 indicates whether the encoded packets of a received signal are arriving corrupted, and is a good indication for the presence of interference particularly when packet errors are present and/or when the average packet error rate (PER) exceeds a predetermined amount (e.g., 5 out of every 79 packets in one embodiment or 7 out of every 79 packets in another embodiment). In general, packet errors and a PER may be determined in a variety of ways. In one embodiment, a header error checksum (HEC) may be used to determine if errors exist in received packet headers, and packet error indication 562 may indicate whether any such header errors exist. In another embodiment, a cyclic redundancy checksum (CRC) may be used to determine if errors exist in the contents of received packets, and packet error indication 562 may indicate whether any such content errors occur. In other embodiments, an packet error rate (PER) may be determined for a set of packets (e.g., based on detected HEC or CRC errors), and packet error indication 562 may indicate such an error rate. It is noted that, in various embodiments, packet error indication 562 may be determined by various sources such as processor unit 130, receiver unit 120, etc.

Symbol detector difference indication 564 indicates whether the outputs of symbol detectors in symbol detector unit 240 differ, and provides an indication for the presence of interference particularly when the outputs of symbol detectors differ. In one embodiment mentioned above, multiple outputs of symbol detectors 414 (or symbol detectors 450 and 460) may be provided to processor unit 130 for comparison, and processor unit 130 may generate symbol detector difference indication 564 to indicate the result of the comparison. In other embodiments, the comparison for symbol detector difference indication 564 may be performed elsewhere such as receiver unit 120 or power control unit 250.

Correlation indication 566 is the computed correlation between two symbol detector outputs (e.g., LS0 and LS1/LS2), and is a statistical indicator of an interfering signal at a particular range of frequencies. In particular, correlation indication 566, in some embodiments, may indicate a low SNR for the received signal when the variance of correlation indication 566 is greater than 8, and may indicate a high SNR when the variance of the correlation indication 566 is less than 1. For example, LS0 requires a high SNR in order for it to obtain the same bit error rate (BER) as LS1 or LS2. If the outputs of LS0 and LS2 are similar, then a high SNR exists and little interference is present. On the other hand, if the outputs of LS0 and LS2 differ significantly, then the SNR must be low due to noise or interference. In one embodiment, processor unit 130 may generate correlation indication 566. In another embodiment, receiver unit 120 may generate correlation indication 566.

Bias mode 550 selects an appropriate bias current (e.g., full bias or reduced bias) to apply to ADC unit 220. In one embodiment, bias mode 550 may merely indicate the desired mode, which in response causes the receiver unit 120 to change the bias current that is applied to ADC unit 220. For example, power control unit 250 may change the bias current through adjusting a value in a register of register bank 310. In alternative embodiment, power control unit 250 may directly change the bias current that is applied to ADC unit 220 through changing the state of a circuit switch. In yet other embodiments, power control unit 250 may directly supply the bias current, where bias mode 550 is the bias current of ADC unit 220. In various embodiments, the automatic gain control (AGC) of amplifier unit 210 may be adjusted based on the selection of bias mode 550.

Detector selection 552 may select a desired symbol detector of symbol detector unit 240. As mentioned above, detector selection 552 may be the input of a multiplexer that selects the output of a symbol detector (e.g., MUX 410 and 470). In one embodiment, detector selection 552 may disable/turn off one or more non-selected symbol detectors.

Quadrature path selection 554 instructs receiver unit 120 to operate using one or both of the quadrature datapaths. In one embodiment, quadrature path selection 554 disables one or more ADCs located in ADC unit 220 if one quadrature datapath is disabled. In other embodiments, quadrature path selection 554 disables one or more filters and/or mixers in signal processing unit 230 when one quadrature datapath is disabled. In some embodiments, quadrature path selection 554 controls circuitry to clock gate the respective clock signals of various components. In various embodiments, quadrature selection 554 disables (without limitation) other receiver components, including, but not limited to, various analog or digital circuits including analog mixers, filters, amplifiers, LO drivers, etc. In certain embodiments, quadrature path selection 554 adaptively changes the low-intermediate frequency (IF) of the received signal—e.g., when receiving Bluetooth enhanced data rate (EDR) frames and using a single quadrature datapath.

As noted above, power control unit 250 may use different combinations of inputs and outputs as desired in other embodiments. For example, power control unit 250 may change settings or disable other components of receiver unit 120, as desired.

Figure 6A:
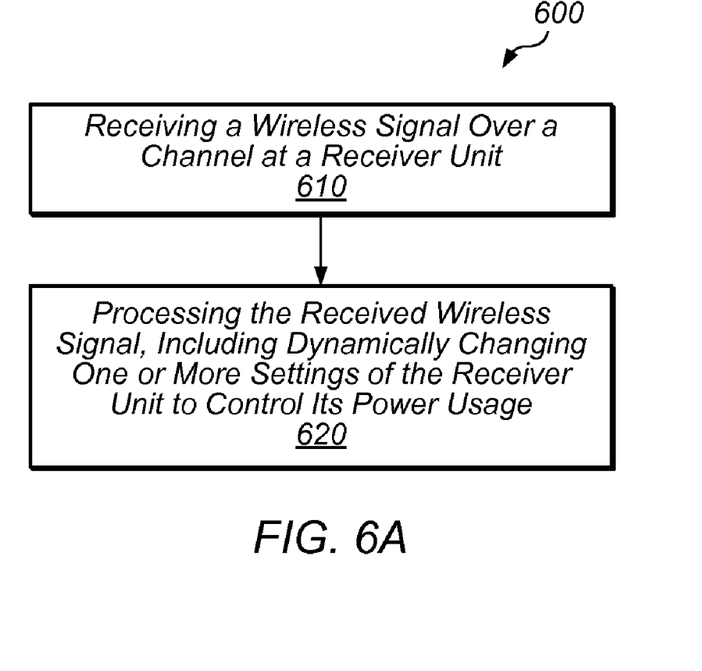
FIG. 6A is a flowchart depicting one embodiment of a method implemented by a receiver unit containing a power control unit.

FIG. 6A is a flowchart of method 600. Method 600 is one embodiment of a method implemented by receiver unit 120. In step 610, receiver unit 120 receives a wireless signal over a channel. In step 620, receiver unit 120 processes the received signal using its various components, which may vary, e.g., as shown in FIGS. 2A-D above. As state of the channel varies over time, one or more settings of the receiver unit 120 are dynamically changed to control the receiver unit's power usage in response to power setting values 510 that are generated based on a first set of information that includes state information for the channel (e.g., channel state information 516). For example, if a received signal has ample strength and is experiencing little interference, then less performance may be needed, and the first set of information may indicate to select lower power usage settings. On the other hand, if the signal is weaker or is experiencing significant interference, then the first set of information may indicate to change settings for better performance and greater power usage.

Figure 6B:
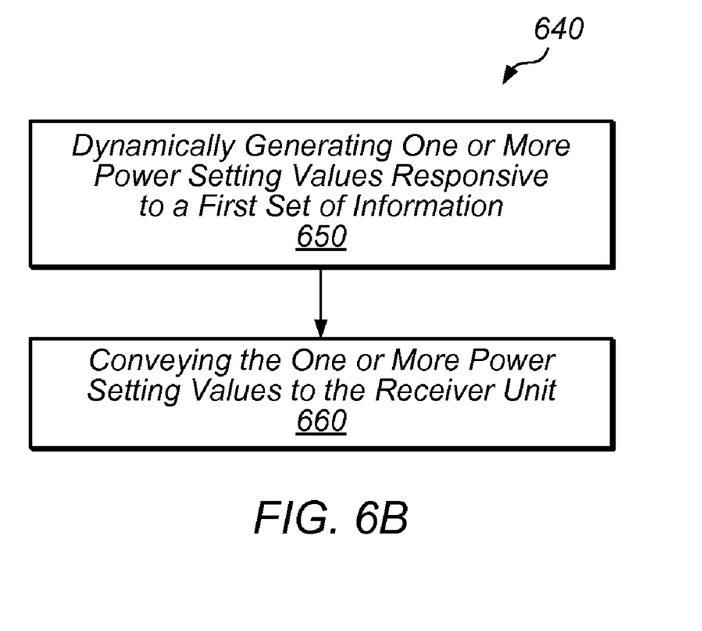
FIG. 6B is flowchart depicting one embodiment of a method implemented by a power control unit.

FIG. 6B is a flowchart of method 640. In one embodiment, method 640 may be implemented by power control unit 250. In step 650, power control unit 250 dynamically generates one or more power setting values 510 responsive to a first set of information that provides partial state information for a wireless channel (e.g. channel state information 516), during a communication session over the wireless channel. The communication session may include reception of a wireless signal by receiver unit 120 that includes at least one analog circuit for processing the wireless signal. In step 660, power control unit 250 conveys the one or more power setting values 510 to receiver unit 120, causing the receiver unit 120 to change one or more settings to control its power usage (e.g., by controlling one or more analog circuits). For example, if the first set of information indicates that a received signal has ample strength and is experiencing little interference, the generated one or more power settings values 510 may cause the receiver unit 120 to lower its power usage (e.g., for a particular analog circuit). On the other hand, if the first set of information indicates that the signal is weaker or is experiencing significant interference, then the generated one or more power settings values 510 may cause the receiver unit 120 to increase its power usage.

Figure 7:
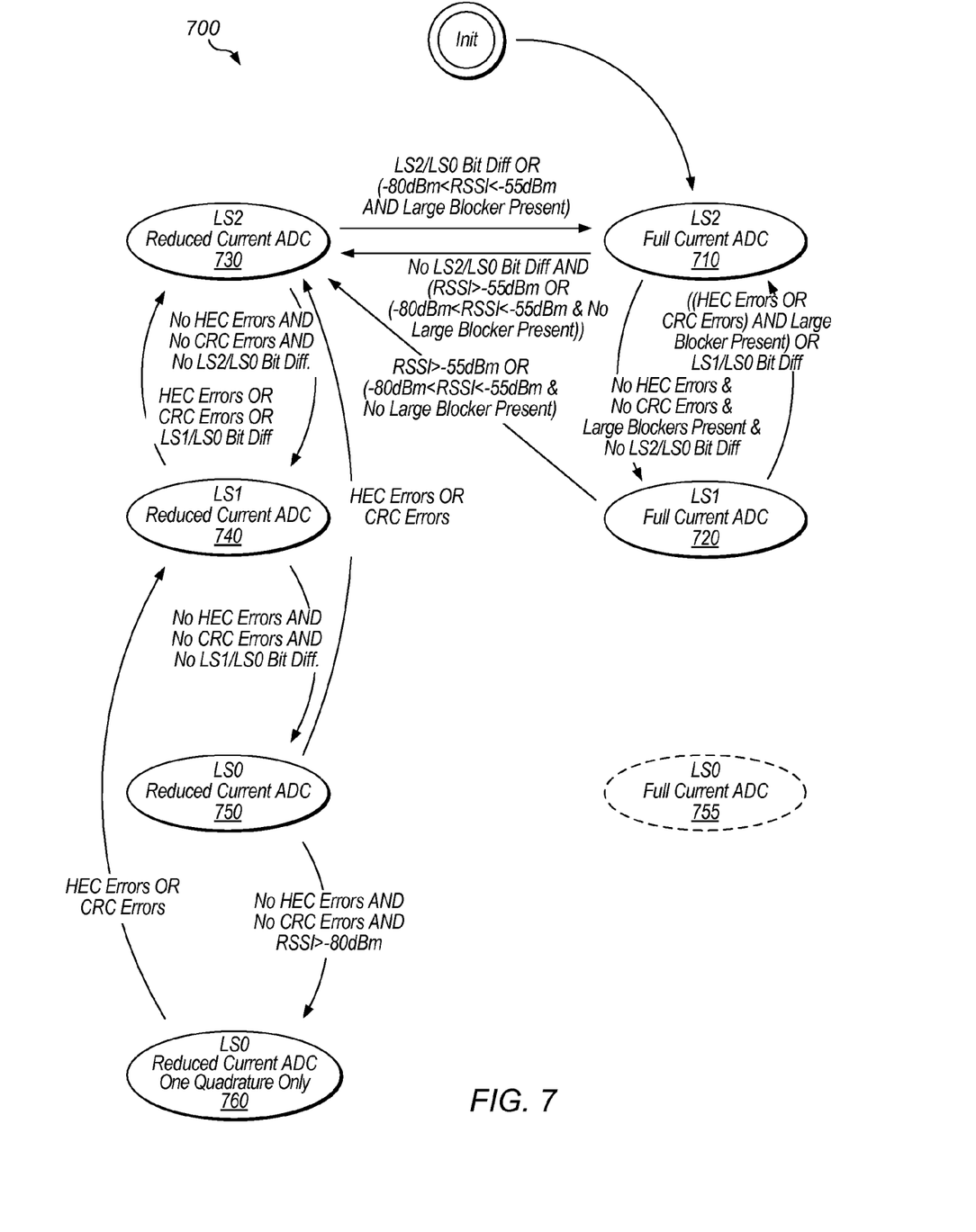
FIG. 7 is a flowchart of one embodiment of a method implemented by a power control unit coupled to an ADC unit and a symbol detector unit.

FIG. 7 illustrates a flowchart of one embodiment of a method (method 700) for regulating power usage in receiver unit 120. In one embodiment, method 700 may be implemented by power control unit 250 coupled to an ADC unit 220 and a symbol detector unit 240 (connections to other blocks are also possible). In one embodiment, method 700 may be implemented when the received wireless signal is modulated using GFSK modulation. States 710-760 represent various states that provide various levels of performance while consuming different amounts of power. When the flowchart proceeds from state 710 to state 760, a receiver consumes less and less power while reducing its dynamic range. Many variations of method 700 are possible. Method 700 may be particularly suited to implementing a Bluetooth-compatible receiver unit 120.

After initializing, method 700 begins in state 710, with the receiver unit 120 operating at its highest power setting. There, power control unit 250 selects symbol detector LS2 and a full-bias current for ADC unit 220. When higher performance is no longer needed, power control unit 250 may move to a lower performance state. For example, if packets encoded on the wireless signal are not experiencing HEC errors or CRC errors, inputs to power control unit 250 indicate the presence of a "large" blocker, and there are no differences detected between the outputs of detectors LS2 and LS0 (or the differences do not rise to the level of some predetermined threshold), method 700 proceeds to state 720. (Indicators of a large blocker may include, in one embodiment, any of the following conditions: 1) the average PER exceeding 5/79 or 2) the RSSI exceeding −85 dBm and packets experiencing HEC errors.) Alternatively, if the Boolean expression "No LS2/LS0 Bit Diff AND (RSSI>−55 dBm OR (−80 dBm<RSSI<−55 dBm & No Large Blocker Present))" is satisfied (i.e., if there are no differences detected between the outputs of LS2 and LS0 (or the differences do not rise to the level of some predetermined threshold) and either a) the RSSI is greater than −55 dBm or b) the RSSI is between −80 dBm and −55 dBm when no large blockers are present), then method 700 proceeds to state 730.

In state 720, power control unit 250 selects symbol detector LS1 and a full-bias current for ADC unit 220. If the Boolean expression "((HEC Errors OR CRC Errors) AND Large Blocker Present) OR LS1/LS0 Bit Diff" is satisfied (i.e., if packets are experiencing HEC errors or CRC errors and a large blocker is present or if the outputs LS0 and LS1 differ (e.g., by some predetermined amount, as determined by processor unit 130—e.g., LS0 and LS1 differ by ten 10 bits during some predetermined time period)), method 700 returns to state 710. However, if RSSI is greater than −55 dBm or if the RSSI is between −80 dBm and −55 dBm and no large blockers are present, method 700 proceeds to state 730.

In state 730, power control unit 250 selects symbol detector LS2 and a reduced-bias current. If more performance is required, method 700 may return to state 710 when the Boolean expression "LS2/LS0 Bit Diff OR (−80 dBm<RSSI<−55 dBm AND Large Blocker Present)" is satisfied (i.e., LS0 and LS2 differ (e.g., by some predetermined amount, as determined by processor unit 130—e.g., LS0 and LS2 differ by ten 10 bits during some predetermined time period) or if the RSSI is between −80 dBm and −55 dBm and a large blocker becomes present. Alternatively, if packet transmission is not experiencing any HEC errors or CRC errors and there are no differences detected between the outputs of detectors LS2 and LS0 (or the difference do not rise to the level of some predetermined threshold), method 700 proceeds to state 740.

In state 740, symbol detector LS1 and a reduced-bias current for ADC unit 220 are selected by power control unit 250. If packet transmission is experiencing any HEC or CRC errors, or the outputs of LS0 and LS1 differ (e.g., by some predetermined amount), method 700 returns to state 730. On the other hand, if no HEC and CRC errors exist and there are no differences between the output of symbol detector LS1 and LS0 (or the differences do not rise to some predetermined threshold), method 700 proceeds to state 750.

In state 750, symbol detector LS0 and a reduced-bias current for ADC unit 220 are selected by power control unit 250. If packet transmission experiences any HEC or CRC errors, method 700 returns to state 730. Alternatively, if no HEC or CRC errors exist and RSSI is greater than −80 dBm, method 700 proceeds to state 760.

In state 760, power control unit 250 selects symbol detector LS0 and a reduced-bias current for ADC unit 220, and instructs receiver unit 120 to use only one quadrature of the received signal. If the transmission experiences any HEC or CRC errors, method 700 returns to state 740.

It is noted that the method 700 may not be applicable in all situations or may be modified in various embodiments, as desired. For example, in one embodiment, method 700 may be applied only when a 1 Mbps transmission rate is used. In such an embodiment, method 800 (described below with reference to FIG. 8) may be applied when 2 Mbps or 3 Mbps transmission rates are used.

Similarly, method 700 may not be applicable to all types of packets within a particular transmission rate. For example, within the context of method 700, receiver unit 120 may receive packets that do not contain HEC or CRC fields (e.g. audio packets). In such embodiments, power control unit 250 may generate different power setting values 510 based on packet type (e.g. if the packet transmission contains audio packets without checksums, LS0 is selected when RSSI is greater than −55 dBm, and LS2 is selected if the RSSI is less than −55 dBm). In other embodiments, additional states may be added to method 700. For example, method 700 may implement an additional state 755, in which symbol detector LS0 and a full-bias current for ADC unit 220 are selected. Depending on the transmission, method 700 may proceed to state 755 from various other states in FIG. 7 (e.g., state 750 or state 720). In one embodiment, state 755 may be implemented as an alternative to state 750.

Figure 8:
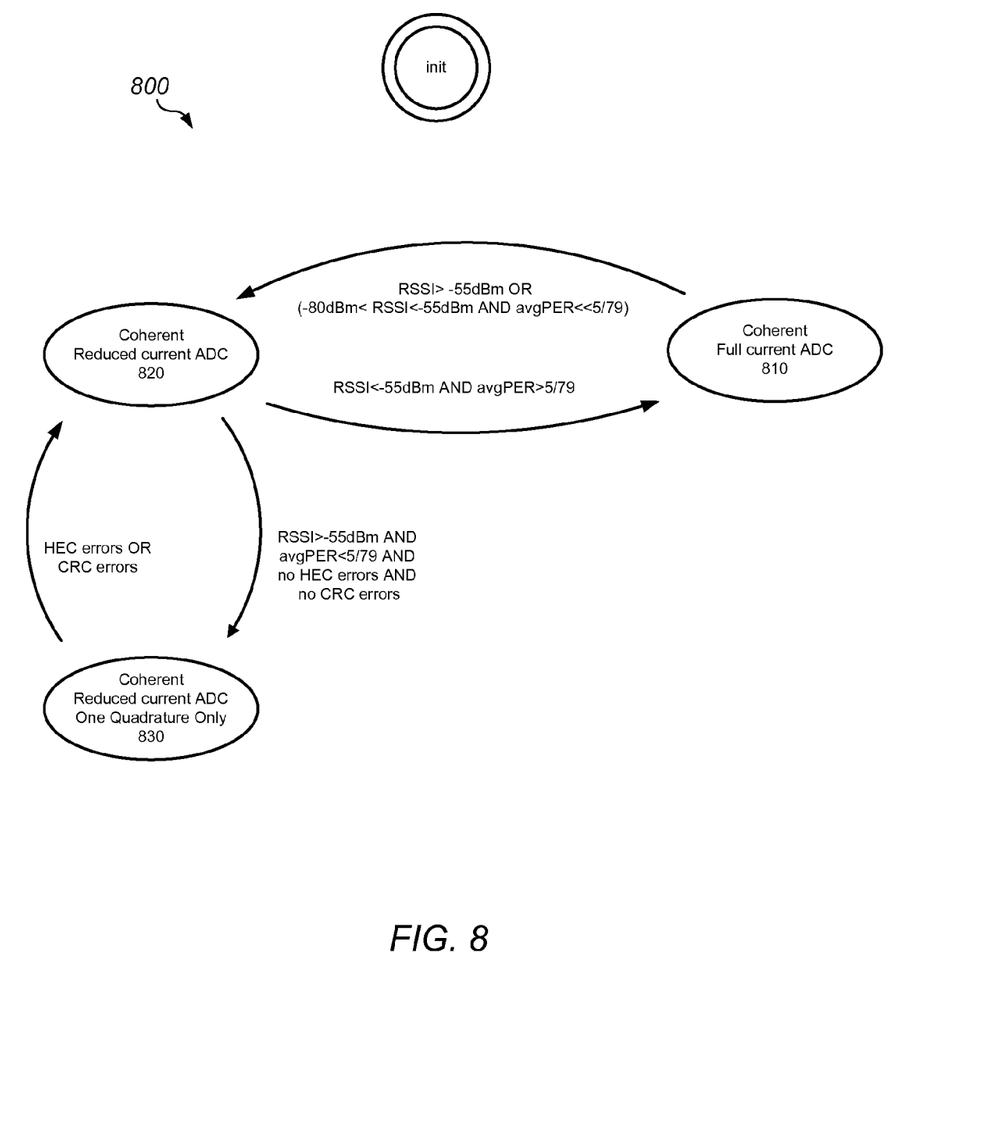
FIG. 8 is a flowchart of one embodiment of a method implemented by a power control unit coupled to an ADC unit.

FIG. 8 illustrates a flowchart of method 800 usable to regulate power usage of receiver unit 120. In one embodiment, method 800 may be implemented by a power control unit 250 coupled to an ADC unit 220 and various other units. When method 800 proceeds from blocks 810-830, receiver unit 120 consumes less power while reducing its dynamic range. In one embodiment, method 800 is used when the received wireless signal is modulated with PI/4-DQPSK and 8-DPSK modulation schemes. Like method 700, method 800 may be particularly suited to implementing a Bluetooth-compatible receiver unit 120.

After initializing in state 810, power control unit 250 selects a coherent symbol detector and a full-bias current for ADC unit 220. During transmission, method 800 proceeds to state 820 when RSSI is greater than −55 dBm or when RSSI is between −80 dBm and −55 dBm and the average packet error rate is less than 5 out of 79.

In state 820, power control unit 250 selects a reduced-bias current for ADC unit 220. Method 800 returns to state 810 if RSSI is between −80 dBm and −55 dBm and the average packet error rate exceeds 5 out every 79 packets. Alternatively, if RSSI is greater than −55 dBm, the average packet error rate is less than 5 out of 79, and no HEC or CRC errors are present, then method 800 proceeds to step 830.

In state 830, power control unit 250 selects a reduced current mode for ADC unit 220 and instructs receiver unit 120 to disable one quadrature datapath. Such a configuration consumes significantly less power because the circuitry that processes one of the two quadrature data streams is disabled. If the transmission experiences any HEC or CRC errors, method 800 returns to state 820.

In certain embodiments, receiver unit 120 is configured to adaptively change the low-intermediate frequency (IF) when it receives Bluetooth enhanced data rate (EDR) frames. In order for EDR frames to work in a low-IF system, power control unit 250 may be configured to increase the intermediate frequency (IF) when the receiver unit 120 is entering single-quadrature mode. In one particular embodiment, receiver unit 120 may employ a 500 kHz offset for a 1 MHz wide received signal, but such an offset may not work well with 8DPSK frames in EDR mode. As such, receiver unit 120 may increase the received signal to 700 kHz or more to fix this problem.

Various embodiments for regulating the power usage of a receiver unit described herein may include storing instructions and/or data implemented in accordance with the foregoing description in an article of manufacture such as tangible computer-readable memory medium, including various portions of the memory in receiver unit 120, processor unit 130 (e.g., memory 134), and power control unit 250. Certain embodiments of these tangible computer-readable memory media may store instructions that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc. Power control unit 250 shown in FIGS. 5A and 5B, for example, may include tangible computer-readable media storing program instructions that are executable for dynamically generating one or more power setting values. Receiver unit 120, for example, may include tangible computer-readable media storing program instructions that are executable for dynamically changing one or more settings to control power usage. In general, any of the methods described herein as being implementable in software may be implemented using program instructions that are stored on various forms of tangible computer-readable media.

Further embodiments of programs described herein may include storing/encoding instructions and/or data on signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   a receiver unit receiving a wireless signal over a channel, wherein the received wireless signal includes I and Q quadrature components;
   the receiver unit processing the received wireless signal with a selected one of a plurality of symbol detectors, wherein the plurality of symbol detectors include symbol detectors that are associated with different modulation types and that have different performance characteristics;
   the receiver unit dynamically changing the selected symbol detector based on state information for the channel, wherein the state information includes a received signal strength indication (RSSI) of the wireless signal and/or a packet error rate (PER) for data packets encoded on the wireless signal; and
      the receiver unit dynamically changing a setting of the receiver unit that causes the receiver unit to discard one of the quadrature components.

2. The method of claim 1, wherein the processing includes an analog-to-digital converter (ADC) performing an analog-to-digital conversion of the wireless signal; and
   wherein the method further comprises the receiver unit dynamically changing a bias current applied to the ADC based on the state information.

3. The method of claim 1, wherein the state information includes information indicative of header error check (HEC) and cyclical redundancy check (CRC) errors.

4. An apparatus, comprising:
   a receiver unit configured to receive a wireless signal including I and Q quadrature components over a wireless channel and to process the wireless signal with an active one of a plurality of symbol detectors, wherein the plurality of symbol detectors include symbol detectors that are associated with different modulation types and that have different performance characteristics, wherein the receiver unit is configured to dynamically change the active symbol detector based on a first selection from a power control unit, and to dynamically discard one of the quadrature components based on a second selection from the power control unit;
   wherein the power control unit is configured to make the first and second selections based on state information for the wireless channel, wherein the state information includes a received signal strength indication (RSSI) of the wireless signal and/or a packet error rate (PER) for data packets encoded on the wireless signal.

5. The apparatus of claim 4, wherein the receiver unit includes the power control unit.

6. The apparatus of claim 4, wherein the power control unit includes a processor and a memory, and wherein the power control unit is configured to select the active symbol detector by the processor executing program instructions stored in the memory.

7. The apparatus of claim 6, wherein the processor and the receiver unit are on a common die.

8. The apparatus of claim 4, wherein the receiver unit includes:
   an amplifier unit configured to receive the wireless signal via an external interface of the receiver unit and amplify the received wireless signal; and
   a sigma-delta analog-to-digital converter (ADC) configured to receive the amplified wireless signal and produce a digitized version of the wireless signal;
   wherein the receiver unit is configured to dynamically change a bias current supplied to the ADC.

9. The apparatus of claim 4, wherein the receiver unit is a Bluetooth receiver unit, and wherein the state information includes information indicative of the presence of a large blocker.

10. A method, comprising:
    during a communication session over a wireless channel that includes reception, by a receiver unit, of a wireless signal having I and Q quadrature components, dynamically selecting one of a plurality of symbol detectors of the receiver unit based on state information for the wireless channel, wherein the state information includes a received signal strength indication (RSSI) of the wireless signal and/or a packet error rate PER for data packets encoded on the wireless signal, wherein the plurality of symbol detectors include symbol detectors that are associated with different modulation types and that have different performance characteristics;
    conveying an indication of the selected symbol detector to the receiver unit, wherein the conveying causes the receiver unit to process the wireless signal with the selected symbol detector;
    disabling one quadrature datapath of the receiver unit; and adaptively changing an intermediate frequency (IF) of the wireless signal based on the state information.

11. The method of claim 10, wherein the receiver unit includes an analog-to-digital conversion (ADC) unit, wherein the method further comprises:
   based on the state information, causing the receiver unit to change from operating the ADC unit in a full-bias current mode to operating the ADC unit in a reduced-bias current mode.

12. The method of claim 10, wherein the plurality of symbol detectors includes first and second symbol detectors, wherein the receiver unit is configured to provide an output from the first symbol detector in parallel with an output from the second symbol detector, and wherein the state information includes information indicative of differences in bits detected by the first and second symbol detectors.

13. The method of claim 10, wherein the communication session is a Bluetooth communication session, and wherein the different modulation types include: GFSK, pi/4-DQPSK, 8-DPSK.

14. The method of claim 10, wherein the communication session is a Bluetooth communication session using enhanced data rate (EDR) frames.

15. A method, comprising:
   during a communication session over a wireless channel that includes reception of a wireless signal by a receiver unit, dynamically selecting one of a plurality of symbol detectors of the receiver unit based on state information for the wireless channel, wherein the plurality of symbol detectors include symbol detectors that are associated with different modulation types and that have different performance characteristics, wherein the communication session is a Bluetooth communication session, and wherein the different modulation types include: GFSK, pi/4-DQPSK, 8-DPSK;
   conveying an indication of the selected symbol detector to the receiver unit, wherein the conveying cause the receiver unit to process the wireless signal with the selected symbol detector.

16. A method, comprising:
   during a communication session over a wireless channel that includes reception of a wireless signal by a receiver unit, dynamically selecting one of a plurality of symbol detectors of the receiver unit based on state information for the wireless channel, wherein the plurality of symbol detectors include symbol detectors that are associated with different modulation types and that have different performance characteristics, wherein the communication session is a Bluetooth communication session using enhanced data rate (EDR) frames;
   conveying an indication of the selected symbol detector to the receiver unit, wherein the conveying cause the receiver unit to process the wireless signal with the selected symbol detector; and
   disabling one quadrature datapath of the receiver unit; and
   adaptively changing an intermediate frequency (IF) of the wireless signal.

* * * * *